(12) United States Patent
Bourdin et al.

(10) Patent No.: US 7,726,854 B2
(45) Date of Patent: Jun. 1, 2010

(54) LIGHTING OR SIGNAL DEVICE WITH AN OPTICAL GUIDE FOR A MOTOR VEHICLE

(75) Inventors: David Bourdin, Livry Gargan (FR); Christophe Dubosc, Villemomble (FR); Julien Muller, Paris (FR)

(73) Assignee: Valeo Vision, Bobigny (FR)

( * ) Notice: Subject to any disclaimer, the term of this patent is extended or adjusted under 35 U.S.C. 154(b) by 214 days.

(21) Appl. No.: 11/539,738

(22) Filed: Oct. 9, 2006

(65) Prior Publication Data

US 2007/0121334 A1 May 31, 2007

(30) Foreign Application Priority Data

Oct. 11, 2005 (FR) .................................. 05 10391

(51) Int. Cl.
*F21V 7/04* (2006.01)
(52) U.S. Cl. ........................ 362/487; 362/511; 362/610; 362/626
(58) Field of Classification Search .................. 362/600, 362/84, 606, 610, 617, 620, 626, 511
See application file for complete search history.

(56) References Cited

U.S. PATENT DOCUMENTS

| 4,949,226 | A | 8/1990 | Makita et al. |
| 5,050,946 | A | 9/1991 | Hathaway et al. |
| 5,835,661 | A | 11/1998 | Tai et al. |
| 6,231,201 | B1 * | 5/2001 | Rupp .......................... 362/614 |
| 6,275,339 | B1 * | 8/2001 | Chazallet et al. ............. 359/599 |
| 6,637,924 | B2 | 10/2003 | Pelka et al. |
| 6,997,595 | B2 * | 2/2006 | Mi et al. ...................... 362/626 |
| 7,104,678 | B2 | 9/2006 | De Lamberterie |
| 7,111,970 | B2 | 9/2006 | Gasquet |
| 7,232,250 | B2 * | 6/2007 | Chuang ....................... 362/620 |
| 7,278,766 | B2 * | 10/2007 | Machi et al. ................. 362/470 |
| 7,334,923 | B2 * | 2/2008 | Tanaka et al. ................ 362/494 |
| 2002/0114168 | A1 | 8/2002 | Pelka et al. |
| 2004/0052079 | A1 | 3/2004 | Nakano |
| 2004/0136203 | A1 | 7/2004 | Gasquet |
| 2004/0184286 | A1 | 9/2004 | De Lamberterie |
| 2005/0276565 | A1 | 12/2005 | Bourdin et al. |

FOREIGN PATENT DOCUMENTS

| DE | 10036812 | 2/2002 |
| EP | 0478102 | 4/1992 |
| EP | 1434000 | 6/2004 |
| EP | 1443265 | 8/2004 |
| EP | 1605201 | 12/2005 |
| WO | WO 0240917 | 5/2002 |

* cited by examiner

*Primary Examiner*—Anabel M Ton
(74) *Attorney, Agent, or Firm*—Jacox, Meckstroth & Jenkins

(57) ABSTRACT

A lighting and/or signaling device for a motor vehicle, comprising at least one light source emitting a light beam and at least one optical guide in which the light beam propagates, the optical guide comprising: a first face forming an exit face for the light beam, and a second face, opposite to the exit face, forming a reflection face for the light beam, such that the light guide is associated with a diffusing screen disposed opposite the reflection face of the light guide.

23 Claims, 2 Drawing Sheets

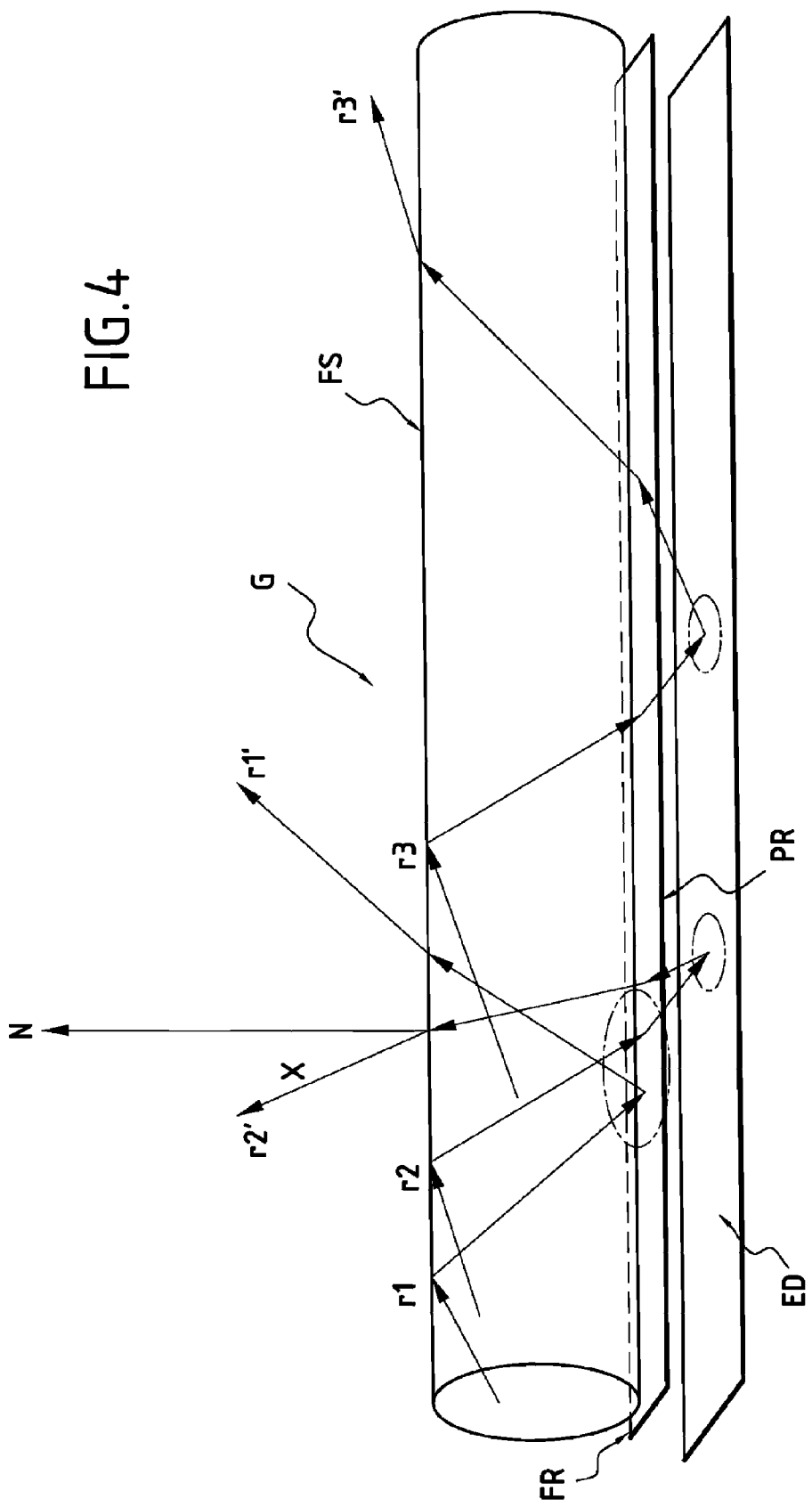

LIGHTING OR SIGNAL DEVICE WITH AN OPTICAL GUIDE FOR A MOTOR VEHICLE

BACKGROUND OF THE INVENTION

1. Field of the Invention

The object of the present invention is a lighting or signaling device equipping a motor vehicle, comprising at least one optical guide able to produce diffusion of the light over at least part of its length. The invention also concerns a vehicle comprising such a lighting or signaling device.

2. Description of the Related Art

In the field of motor vehicle lighting and signaling, optical guides are being used more and more frequently. An optical guide is, very schematically, an elongate element made from transparent material, generally in the form of a cylinder. Close to one of the ends of the guide, referred to as the guide entry face, one (or more) light source is disposed, for example a small light source of the light emitting diode type: the light rays emitted by this source propagate by total reflection in the length of the guide in the direction of its opposite end, referred to as the end face of the guide. Some of the light rays propagating in the guide will emerge from it in the so-called front face of the guide by virtue of the presence of reflecting elements disposed on the so-called rear face of the guide, opposite to the previous one. These reflecting elements consist for example of prisms. The guide thus emits light over its entire length. It has the advantage of being able to take very varied geometric forms, be it rectilinear or in an arc of a circle, and bring an illuminating surface even into areas of the vehicle headlight or light that are not very accessible. It thus participates greatly in the style of the headlight or light. However, existing light guides are open to improvement: this is because it is often tricky to ensure an identical illumination level between the first and second ends of the guide, particularly if it has a significant length, the illumination level having a tendency to decrease on moving away from the entry face of the guide. Moreover, it is also tricky to ensure a homogeneous appearance to the guide whatever the angle of vision that there is of the guide, the light emerging from the guide having an angular distribution that is often insufficiently broad. However, it is an important point according to the arrangement of the guide and its shape inside the headlight or light: there is a tendency to design the guide so that it illuminates mainly in the axis of the vehicle in order to meet photometric standards. However, it also proves important to have a homogeneous and visually agreeable illuminated appearance also when the observer moves away from the longitudinal axis of the vehicle. It may also be wished to improve the optical efficiency of the guide since there may be leakages of light therein lost through the rear face of the guide in particular.

It is already known from the patent EP 1 443 265 how to associate a light guide with a reflector situated at the rear of the light guide in order best to limit the leakages of light and thus improve the optical efficiency of the guide.

The aim of the invention is then to obtain an improved light guide that makes it possible in particular to have a more homogeneous illuminated appearance, particularly in a wide range of vision angles of incidence.

SUMMARY OF THE INVENTION

The object of the invention is first of all a lighting and/or signaling device for a motor vehicle comprising at least one light source emitting a light beam and at least one optical guide in which the said light beam propagates, said optical guide comprising a first face forming an exit face for the light beam, and
a second face, opposite to the exit face, forming a reflection face for the light beam, such that the light guide is associated with a diffusing screen disposed opposite the reflection face of the light guide.

It has been possible to show that the presence of this diffusing element had, surprisingly, a significant impact on the illuminated appearance of the guide: it makes it possible in fact to recuperate the light escaping from the guide from its rear face and to return it at least partly into the guide with a high angular width, because of its diffusing character. This has two advantageous consequences: the guide has a higher optical efficiency, and it emits a more spread light through its front face, with a more anisotropic direction: from wherever it is observed, the guide keeps a fairly homogeneous illuminated appearance, whilst in the absence of a diffusing element the guide has an appearance that is little or not illuminated nor homogeneous at a high angle of incidence, as soon as one moves away from an angle of vision corresponding to the longitudinal axis of the vehicle in particular.

It has also been observed that the invention allowed the use of this type of linear light guide in order to fulfill a function of the direction indicator repeater type (a function known as "side marker" in English).

Preferably, the reflection face of the guide according to the invention is provided with reflecting prisms. In a known fashion, in fact, the presence of these prisms makes it possible to make a proportion of the light rays leave the guide in a controlled fashion over its length: each ray propagating in the guide and striking the optically active area of these prisms is redirected out of the guide through its front face.

Alternatively or cumulatively with the presence of the prisms, the reflection face of the guide can be provided with light reflection foci, in particular in the form of hollows with respect to the surface of the said face that is otherwise substantially smooth. These reflection foci can be obtained by the surface alteration of the reflection face and can have a design similar to that in the patent EP 1 434 000 for light guides of the more surface than linear type as in the present case.

The reflection face of the guide therefore comprises reflecting means that are in fact decoupling means and that are independent of the diffusing screen, these decoupling means being essential for obtaining the required photometric pattern.

Preferably the diffusing screen has a surface opposite the reflection face of the guide that is essentially opaque to radiation in the visible range, its aim being to recuperate and return in the guide the lost light emerging from the reflection face. Advantageously, the diffusing screen has a surface opposite the reflection face of the guide that is light in color. It may for example be based on titanium oxide or a bleached polymer, in particular bleached polycarbonate.

The diffusing screen can be fixed to or form an integral part of a mask of the device. A mask (bezel in English) is understood to be a style part for ensuring continuity of surface between, for example, a reflector and the edge of a housing or the headlight or light lens. The bezel may have various appearances, in particular matt or on the contrary bright and approaching the appearance of the reflector. Integrating the diffusing screen according to the invention in a bezel associated with a reflector of a main lighting or signaling function is technically advantageous: no additional part is added, and there is a gain in simplicity of assembly and in tolerance in positioning between the components of the light or headlight overall. The diffusing screen can form an integral part of a bezel of the device, by local modification of the surface properties/appearance of the said bezel, in particular by surface erosion, or addition or elimination of a coating. It may for example be a case of an aluminized bezel, an area of which has no layer of aluminum and is possible frosted in order to have a sufficient level of diffusing power.

The diffusing screen is designed so that the light rays that reach it produce a very broad beam when starting off again towards the guide, and—on average—in a direction opposite to the incident direction of the rays on the screen. The screen can take the form of a reflector with strong graining. It can also be in the form of a substrate made from diffusing polymer material, one side of which is made reflecting, by the deposition of a layer of metal, aluminum for example.

It is advantageous for the diffusing screen not to be too close or even in direct contact with the guide: a distance of at least 0.5 mm between the diffusing screen and the reflection face of the guide is generally chosen, in particular a distance between 1 and 5 mm. The efficacy of the screen is improved thereby, the rays re-diffused by the screen then having sufficient path to travel before once again entering the guide in order to spread out with the wide angular amplitude sought.

The diffusing screen thus receives light rays emerging from the guide through the reflection face of the guide and redirects them towards the reflection face with a substantially lambertian angular distribution.

The invention endeavors to "recuperate" light rays that otherwise would be lost, without substantially modifying and without degrading the photometric performance of the other light rays propagating in the guide.

Modification of the guide is simple to achieve, since it is possible to preserve the design of the known light guides and to add this diffusing screen thereto.

These and other objects and advantages of the invention will be apparent from the following description, the accompanying drawings and the appended claims.

The invention will be described in detail by means of a non-limiting example embodiment, illustrated by the following figures:

BRIEF DESCRIPTION OF THE DRAWINGS

FIG. 4 depicts a portion of the guide according to the previous figures, detailing the routing of the light rays through it.

DESCRIPTION OF THE PREFERRED EMBODIMENTS

All these figures are highly schematic and are not necessarily to scale in order to facilitate the reading thereof.

Figure 2:
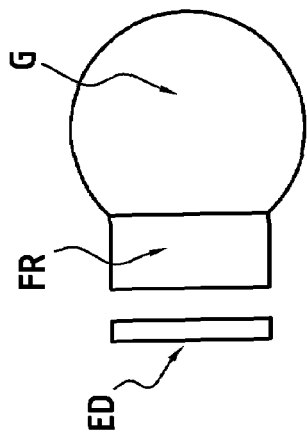
FIG. 2 depicts a transverse section of the guide according to FIG. 1.
Figure 1:
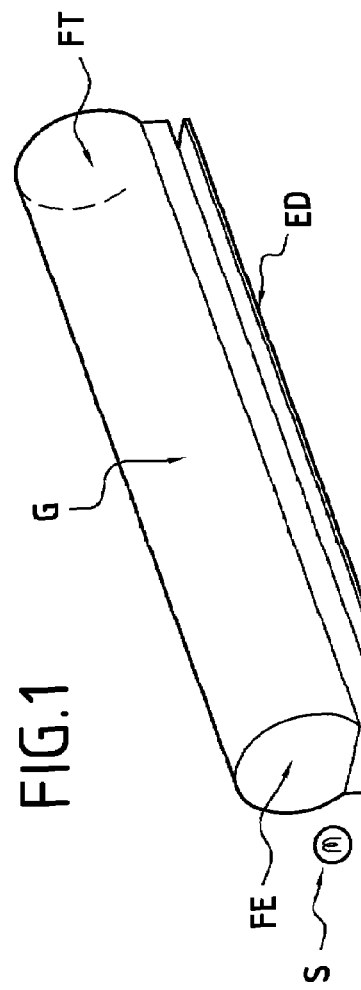
FIG. 1 depicts a perspective view of an optical guide according to the invention intended to be incorporated in a motor vehicle light.

FIGS. 1 and 2 show a view in perspective and cross section of an optical guide G intended to propagate a light beam emitted by a light source S. The optical guide in this example is rectilinear.

Naturally the optical guide according to the invention can have other forms such as for example comprising curvatures, one or more portions of an arc of a circle, etc. The invention also applies to these curved guides mutatis mutandis.

In this embodiment, the optical guide G has a circular cross section; naturally it can also, in other embodiments, have an elliptical, square, oval or even square etc. cross section.

In this embodiment, the optical guide G is based on transparent polymer, polycarbonate (or polymethyl methacrylate PMMA), preferably of crystal quality.

This optical guide has a so-called entry face FE at one of its ends, opposite which there is disposed a light emitting diode S, and an end face FT that constitutes the end opposite to the previous one, and which has no light source. Optionally, it is possible to provide a second light source at each of the ends of the guide. The guide also comprises two main faces oriented along its length:
- a first face FS constituting an exit face for the light rays propagated in the optical guide G; this exit face FS can be smooth and continuous, or comprise serrations
- a second face FR, opposite to the first face FS, constituting a reflection face of the optical guide G, which is therefore provided with reflecting elements.

Figure 3:
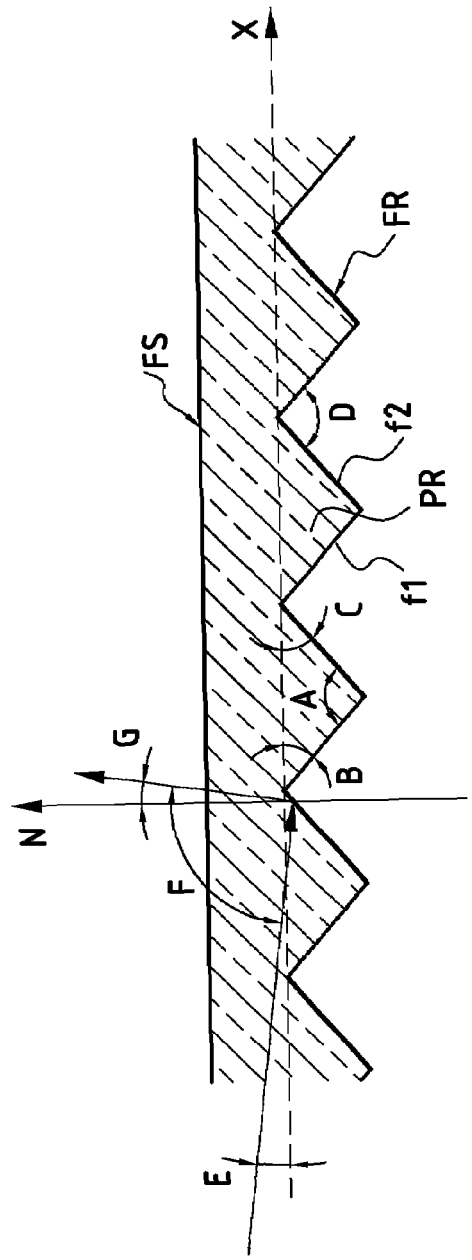
FIG. 3 depicts a longitudinal section of the guide.

According to a first variant, as depicted in FIG. 3, it is a case of a succession of prisms PR. These prisms PR are placed side by side and provide a reflection of the light rays having a non-zero angle of incidence with the axis X of the optical guide G. Each prism has a substantially triangular shape; each prism comprises a base, a facet f1 and a facet f2, planar and non-parallel, and a vertex A. They are here symmetrical with respect to the normal N to the axis X of the optical guide, that is to say they have identical dimensions and angles B and C, on each side of their bisecting lines. They may also be asymmetrical, that is to say they have different dimensions and/or angles B and C. It is then said that the optical guide is of the asymmetric prism type. Examples of non-symmetrical prisms will be found in particular in European patent application EP 05291258.1 filed on 10 Jun. 2005, the publication number which is EP 1 605 201.

According to a second variant (possibly cumulative with the first), the reflecting elements are in the form of reflective spikes; hollows regularly distributed on the surface of the face FR, in particular when the very piece constituting the guide G is molded. For their sizing and distribution, reference can be made in particular to the description of the surface reflecting foci described in patent EP 1 434 000.

A diffusing screen ED is associated according to the invention with this guide. This screen is based on diffusing bleached polycarbonate. It is disposed opposite the face FR of the guide and is chosen so as to be substantially planar. According to the first variant, the crests of the prisms PR on the reflection face FR pass through a plan parallel to the plane of the diffusing screen. Preferably, as illustrated here, the dimensions for the screen are sufficiently great and the distance between guide and screen is chosen such that all or most of the rays escaping through the reflection face of guide are connected by the diffusing screen. The distance between the diffusing surface of the screen and the plane passing through the crests of the prisms of the guide is chosen here so as to be approximately 1 mm. This distance can vary considerably over the length of the guide without significantly losing the advantage procured by the invention. It is only preferred to avoid direct contact between the guide and the screen.

These rays are then returned with a lambertian distribution in the guide, once again passing through the reflection face of the guide. These rays, once returned into the guide, will either continue their propagation path in the guide or emerge through the exit face FS, being added to the other emerging rays. Overall, all the rays emerging through the exit face will therefore be of greater intensity and wider angular distribution, or spread out, and hence a more united appearance and above all more homogeneous whatever the angle of vision.

According to a first variant, the exit face FS of the optical guide is smooth. According to a second variant, not shown, it has a serrated profile, as for example in the aforementioned European patent application. These serrations make it possible to modify the orientation, to "straighten up" the light rays leaving the optical guide, that is to say to make them leave the optical guide with a negative angle with respect to the normal N to the axis X of the guide.

These serrations can be of different forms, for example in the form of prisms or domes or a combination of prisms and domes. When the variant is chosen where the exit face is provided with serrations, each serration on the exit face FS is preferably situated opposite a prism PR (or other reflecting element) of the reflection face FR.

FIG. 4 details the routing of a few light rays in the guide in order to clarify its operating mode in association with the diffusing screen, choosing the variant where the reflection face of the guide is provided with reflecting prisms. Three light rays r1, r2 and r3 emitted by the source S propagate by total reflection in the body of the guide:

the ray r1 reaches the optically active facet f1 of a prism PR of the reflection face FR of the guide G: it is returned towards the exit face FS with an angle such that it leaves the guide in order to give the guide its illuminated appearance (r1').

The ray r2 strikes the reflection face in an inactive, non-reflecting zone (optically non-active facet f2 of the prism, zone separating 2 prisms, etc): it escapes through the guide G through its reflection face FR. Without the invention, it would be lost and would make the light efficiency of the guide decrease. The diffusing screen ED according to the invention collects it and sends it at a given angle towards the reflection face: the ray enters the guide once again, is refracted, and then leaves through the exit face FS of the guide (r2'): it can then, as shown, leave the guide with an angle X that is negative with respect to the normal N to the guide G, unlike the previous ray r1'. By virtue of this diffusing screen, there is thus an illumination of the guide in directions other than those specified in order to design the geometry of the reflecting prisms so as to comply with the regulations in force. This technical effect is very advantageous in particular when this type of guide must equip the light with a large wing return.

the ray r3 follows the same type of routing and return in the guide through the diffusing screen ED, but with a different angle of incidence when it reaches the screen, and therefore an angle of return through the screen, that is different. In fact, it will then be able to leave the guide through the exit face with an angle (r3') different from that r2' and r1'.

Naturally this is only a schematic vision of the path of the light rays, the screen returning the light that reaches it in a diffusing fashion, according to a lambertian distribution.

The rays leaving the face FS of the guide are thus the addition of the rays directly leaving the guide and those that were returned in the guide by the screen. This addition leads to exit angles of the screen emitted by the face FS with a significantly wider angular amplitude. The light guide preserves its illuminated appearance even at a high angle of incidence with respect to the normal to the guide G. The function fulfilled by the guide, in particular the indicator function of the sidelight type, is better fulfilled thereby, and the aesthetic appearance of the guide in the illuminated state is improved.

In one embodiment not shown in the figures for reasons of simplification, the lighting or signaling device of the invention comprises these two light sources each placed at one end of the optical guide. The optical guide can thus propagate light rays from two ends of the optical guide, which makes it possible to increase the length of the optical guide.

In another embodiment of the invention, the lighting or signaling device comprises several optical guides placed so as to have at least one common intersection. The light source is placed at this point of intersection so as to emit light rays in each of the optical guides.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A device for a motor vehicle, comprising at least one light source emitting a light beam and at least one optical guide in which said light beam propagates, said at least one optical guide comprising:
   a first face forming an exit face for said light beam to exit the device outside said motor vehicle, and
   a second face, opposite to said exit face, forming a reflection face for said light beam,
   wherein said at least one optical guide is associated with a diffusing screen disposed relative to said reflection face of said at least one optical guide, so that when viewed relative to a direction or path of a light beam diffused by said diffusing screen, said diffusing screen is encountered first, followed by said reflection face and then said exit face;
   wherein a portion of said light beam is reflected by said reflection face toward said exit face and another portion of said light beam escapes said at least one optical guide through said reflection face and encounters said diffusing screen, which directs it back through said reflection face and toward said exit face.

2. The device according to claim 1, wherein said reflection face is provided with reflecting prisms.

3. A device for a motor vehicle, comprising at least one light source emitting a light beam and at least one optical guide in which said light beam propagates, said at least one optical guide comprising:
   a first face forming an exit face for said light beam to exit the device outside said motor vehicle, and
   a second face, opposite to said exit face, forming a reflection face for said light beam,
   wherein said at least one optical guide is associated with a diffusing screen disposed relative to said reflection face of said at least one optical guide, so that when viewed relative to a direction or path of light beam emission from the light source, said light guide is encountered first, then through said reflection face, followed by said diffusing screen, followed by said reflection face and then said exit face;
   wherein said reflection face is provided with foci reflecting the light beam, in particular in the form of hollows with respect to the otherwise substantially smooth surface of said reflection face.

4. The device according to claim 3, wherein said reflection foci are obtained by surface alteration of said reflection face.

5. A device for a motor vehicle, comprising at least one light source emitting a light beam and at least one optical guide in which said light beam propagates, said at least one optical guide comprising:
   a first face forming an exit face for said light beam, and
   a second face, opposite to said exit face, forming a reflection face for said light beam,
   wherein said at least one optical guide is associated with a diffusing screen disposed opposite said reflection face of said at least one optical guide;

wherein said diffusing screen has a surface opposite said reflection face of said at least one optical guide that is essentially opaque to radiation in the visible range.

6. A device for a motor vehicle, comprising at least one light source emitting a light beam and at least one optical guide in which said light beam propagates, said at least one optical guide comprising:
a first face forming an exit face for said light beam, and
a second face, opposite to said exit face, forming a reflection face for said light beam,
wherein said at least one optical guide is associated with a diffusing screen disposed opposite said reflection face of said at least one optical guide;
wherein said diffusing screen has a surface opposite said reflection face of said at least one optical guide that is light in color;
wherein a portion of said light beam is reflected by said reflection face toward said exit face and another portion of said light beam escapes said at least one optical guide through said reflection face and encounters said diffusing screen, which directs it back through said reflection face and toward said exit face.

7. The device according to claim 1, wherein said diffusing screen has a surface opposite said reflection face of said at least one optical guide that is based on titanium oxide or bleached polymer.

8. The device according to claim 1, wherein said diffusing screen is fixed to or forms an integral part of a bezel of said device.

9. The device according to claim 1, wherein said diffusing screen forms an integral part of a bezel of said device, by local modification of the properties/surface appearance of said bezel, in particular by surface erosion, or the addition or removal of a coating.

10. A device for a motor vehicle, comprising at least one light source emitting a light beam and at least one optical guide in which said light beam propagates, said at least one optical guide comprising:
a first face forming an exit face for said light beam to exit the device outside said motor vehicle, and
a second face, opposite to said exit face, forming a reflection face for said light beam,
wherein said at least one optical guide is associated with a diffusing screen disposed relative to said reflection face of said at least one optical guide, so that when viewed relative to a direction or path of light beam emission from the light source, said diffusing screen is encountered first, followed by said reflection face and then said exit face;
wherein said diffusing screen is disposed at a distance of at least 0.5 mm from said reflection face of said at least one optical guide.

11. A device for a motor vehicle, comprising at least one light source emitting a light beam and at least one optical guide in which said light beam propagates, said at least one optical guide comprising:
a first face forming an exit face for said light beam to exit the device outside said motor vehicle, and
a second face, opposite to said exit face, forming a reflection face for said light beam,
wherein said at least one optical guide is associated with a diffusing screen disposed relative to said reflection face of said at least one optical guide, so that when viewed relative to a direction or path of light beam emission from the light source, said diffusing screen is encountered first, followed by said reflection face and then said exit face;

wherein said diffusing screen receives light rays emerging from said at least one optical guide through said reflection face of said at least one optical guide and redirects them towards said reflection face with a substantially lambertian angular distribution.

12. An optical light guide for a motor vehicle, said optical light guide comprising:
a light guide body;
at least one light source emitting a light beam that propagates through said light guide body;
said light guide body comprising an exit face through which said light beam may exit said light guide body externally of the motor vehicle and a reflection face generally opposed to said exit face and adapted to provide a reflection surface for said light beam; and
a diffusing screen situated in operative relationship to said reflection face of said light guide body in order to direct light beams not reflected by said reflection face toward said exit face;
wherein a portion of said light beam is reflected by said reflection face toward said exit face and another portion of said light beam escapes said at least one optical guide through said reflection face and encounters said diffusing screen, which directs it back through said reflection face and toward said exit face.

13. The optical light guide according to claim 12, wherein said reflection face is provided with reflecting prisms.

14. An optical light guide for a motor vehicle, said optical light guide comprising:
a light guide body;
at least one light source emitting a light beam that propagates through said light guide body;
said light guide body comprising an exit face through which said light beam may exit said light guide body externally of the motor vehicle and a reflection face generally opposed to said exit face and adapted to provide a reflection surface for said light beam; and
a diffusing screen situated in operative relationship to said reflection face of said light guide body in order to direct light beams not reflected by said reflection face toward said exit face;
wherein said reflection face is provided with reflection foci reflecting said light beams, in particular in the form of hollows with respect to the otherwise substantially smooth surface of said reflection face.

15. The optical light guide according to claim 14, wherein said reflection foci are obtained by surface alteration of said reflection surface.

16. An optical light guide for a motor vehicle, said optical light guide comprising:
a light guide body;
at least one light source emitting a light beam that propagates through said light guide body;
said light guide body comprising an exit face through which said light beam may exit and a reflection face generally opposed to said exit face and adapted to provide a reflection surface for said light beam; and
a diffusing screen situated in operative relationship to said reflection face of said light guide body in order to direct light beams not reflected by said reflection face toward said exit face;
wherein said diffusing screen has a surface opposite said reflection face of said light guide body that is essentially opaque to radiation in the visible range.

17. An optical light guide for a motor vehicle, said optical light guide comprising:
a light guide body;

at least one light source emitting a light beam that propagates through said light guide body;

said light guide body comprising an exit face through which said light beam may exit and a reflection face generally opposed to said exit face and adapted to provide a reflection surface for said light beam; and a diffusing screen situated in operative relationship to said reflection face of said light guide body in order to direct light beams not reflected by said reflection face toward said exit face;

wherein said diffusing screen has a surface opposite said reflection face of said light guide body that is light in color.

18. The optical light guide according to claim 12, wherein said diffusing screen has a surface opposite said reflection face of said light guide body that is based on titanium oxide or bleached polymer.

19. A method for improving propagation of light through a light guide used in a device in a motor vehicle, said method comprising the step of:

situating a diffusing screen in operative relationship with a reflecting face on said light guide such that non-reflected or stray light beams that are not reflected by said reflecting face are directed by said diffusing screen toward an exit face of said light guide where they are directed outside the motor vehicle; and said reflecting face being between said diffusing screen and said exit face so that when viewed relative to a direction or path of said light beams emission, said light beams encounter said diffusing screen first, followed by said reflection face and then said exit face.

20. The method according to claim 19, wherein said method provides a reflection face with reflecting prisms.

21. The device according to claim 1, wherein said diffusing screen is disposed at a distance of between 1 and 5 mm from said reflection face of said at least one optical guide.

22. The device according to claim 1, wherein said device is a lighting device.

23. The device according to claim 1, wherein said device is a signaling device.

* * * * *